United States Patent [19]

Kashiwabara

[11] Patent Number: 5,611,748
[45] Date of Patent: Mar. 18, 1997

[54] CONTROL APPARATUS FOR VEHICLE WITH CONTINUOUSLY VARIABLE TRANSMISSION

[75] Inventor: Masuo Kashiwabara, Atsugi, Japan

[73] Assignee: Unisia Jecs Corporation, Atsugi, Japan

[21] Appl. No.: 481,629

[22] Filed: Jun. 7, 1995

[30] Foreign Application Priority Data

Jun. 9, 1994 [JP] Japan .................................. 6-127520

[51] Int. Cl.⁶ ......................................... B60K 41/14
[52] U.S. Cl. .......................... 477/47; 477/37; 477/901
[58] Field of Search ............................... 477/901, 47, 44, 477/37

[56] References Cited

U.S. PATENT DOCUMENTS 4,335,428  6/1982  Miki et al. .................................. 477/901
4,671,138  6/1987  Nobumoto et al. ........................ 477/901

FOREIGN PATENT DOCUMENTS 61-220938  10/1986  Japan .
62-113956   5/1987  Japan .

*Primary Examiner*—Charles A. Marmor
*Assistant Examiner*—Sherry Lynn Estremsky
*Attorney, Agent, or Firm*—Foley & Lardner

[57] ABSTRACT

A control apparatus for a vehicle having a continuously variable transmission between an engine and a drive shaft prevents the transmission from shifting up when an accelerator is released on a curved uphill road, which also prevents transmission-gear-ratio hunting. A high-speed-side upper limit "imax" on the speed change ratio of the transmission is set according to a decreasing function with respect to the absolute value |RΘ| of a hill-climbing resistance and a vehicle speed VSP. A target transmission speed change ratio "itgt", which is determined according to a target horsepower calculated from the hill-climbing resistance, is compared with the upper limit "imax", and if "itgt"> "imax", "itgt" is limited to "imax".

6 Claims, 5 Drawing Sheets

CONTROL APPARATUS FOR VEHICLE WITH CONTINUOUSLY VARIABLE TRANSMISSION

TECHNICAL FIELD

The present invention relates to a control apparatus for a vehicle having a continuously variable transmission (CVT) between an engine and a drive shaft.

BACKGROUND ART

A technique of optimizing the speed change ratio of a CVT of a vehicle according to the slope of a road is disclosed in, for example, Japanese Unexamined Patent Publication No. 61-220938 and Japanese Unexamined Patent Publication No. 62-113956.

In Japanese Unexamined Patent Publication No. 61-220938, the speed change ratio of the CVT is controlled according to a required output (throttle opening) and the slope of a road. More precisely, the speed change ratio is controlled in proportion to the product of a throttle opening and the slope of a road.

In Japanese Unexamined Patent Publication No. 62-113956, the slope of a road is calculated according to the torque, acceleration, etc., of the vehicle to thereby control the speed change ratio of the CVT based on the calculated result. More precisely, transmission speed change maps are changed according to the slope of a road.

These prior techniques, however, have the following problems:

With the first technique, the speed change ratio of the CVT is controlled in proportion to the product of a throttle opening and the slope of a road. Since this product becomes zero when a throttle valve is completely closed, the CVT may be shifted up when an accelerator pedal is released. If the accelerator pedal is released before a curve on an uphill road, the CVT will be shifted up, and if the accelerator pedal is pushed down at the end of the curve, the CVT will be shifted down, to thereby cause transmission-gear-ratio hunting.

With the second technique, although the slope of a road is calculated to change transmission speed change maps, these maps may cause the CVT to be shifted up when the accelerator pedal is released, resulting in transmission-speed change ratio hunting on a curved uphill road.

To solve these problems, an object of the present invention is to provide a control apparatus for a vehicle having a continuously variable transmission, capable of maintaining a proper transmission ratio even when an accelerator is released on a curved uphill road and thereby avoiding transmission-speed change ratio hunting.

SUMMARY OF THE INVENTION

In order to achieve the object, with the present invention, there is provided a control apparatus for a vehicle having a continuously variable transmission between an engine and a drive shaft, including a unit for detecting a value related to the slope of a road, and a speed change ratio limiting unit for limiting, based on the slope-related value, a high-speed-side (low-engine-rotational-speed-side) upper limit on the speed change ratio (output side rotational speed/input side rotational speed) of the continuously variable transmission.

With the present invention, there is also provided a control apparatus for a vehicle having a continuously variable transmission between an engine and a drive shaft, including a unit for detecting a value related to the slope of a road, a unit for calculating a target horsepower to be produced by the vehicle according to at least the slope-related value, a unit for controlling the speed change ratio of the continuously variable transmission, to attain the target horsepower, and a speed change ratio limiting unit for limiting a high-speed-side upper limit on the speed change ratio of the continuously variable transmission based on the slope-related value.

The unit for limiting speed change ratio may set a high-speed-side upper limit on the speed change ratio of the transmission using a decreasing function (a monotone non-increasing function) with respect to the absolute value of the slope-related value.

A control apparatus for a vehicle having a continuously variable transmission between an engine and a drive shaft, may be constructed by a unit for detecting a value related to the slope of a road, a unit for detecting a value related to a vehicle speed, and a speed change ratio limiting unit for limiting a high-speed-side upper limit on the speed change ratio of the continuously variable transmission based on the slope-related value and vehicle-speed-related value.

Also, a control apparatus for a vehicle having a continuously variable transmission between an engine and a drive shaft, may be constructed by a unit for detecting a value related to the slope of a road, a unit for calculating a target horsepower to be produced by the vehicle according to at least the slope-related value, a unit for controlling the speed change ratio of the continuously variable transmission, to attain the target horsepower, a unit for detecting a value related to a vehicle speed, and a speed change ratio limiting unit for limiting a high-speed-side upper limit on the speed change ratio of the continuously variable transmission based on the slope-related value and vehicle-speed-related value.

The unit for limiting speed change ratio may set a high-speed-side upper limit on the speed change ratio of the transmission using a decreasing function (a monotone non-increasing function) with respect to the vehicle-speed-related value.

With such constructions, a value related to the slope of a road is detected and a high-speed-side upper limit on the speed change ratio of a continuously variable transmission is limited based on the detected value. More precisely, the high-speed-side upper limit on the speed change ratio of the transmission is set and limited using a decreasing function (a monotone non-increasing function) with respect to the absolute value of the slope-related value. Therefore, when the slope of a road is large, the transmission from shifted up to a high-speed gear may prevented and the driving on a low-speed gear may be achieved. Namely, the transmission from shifted up when an accelerator pedal is released on a curved uphill road may be prevented, to thereby avoid transmission-gear-ratio hunting on the curved uphill road.

Moreover, a value related to a vehicle speed is detected and a high-speed upper limit on the speed change ratio of the continuously variable transmission is limited based on the vehicle-speed-related value. More precisely, the high-speed-side upper limit is set and limited using a decreasing function (a monotone non-increasing function) with respect to the vehicle-speed-related value. Therefore, since the rolling resistance and air-resistance of the vehicle increase as the speed of the vehicle becomes faster, the transmission on a low-speed side is operated. This more effectively prevents transmission-gear-ratio hunting on a curved uphill road.

Arrangements, operations, and effects characteristic to the present invention will be clarified through embodiments and drawings.

DETAILED DESCRIPTION OF THE PREFERRED EMBODIMENTS

Figure 1:
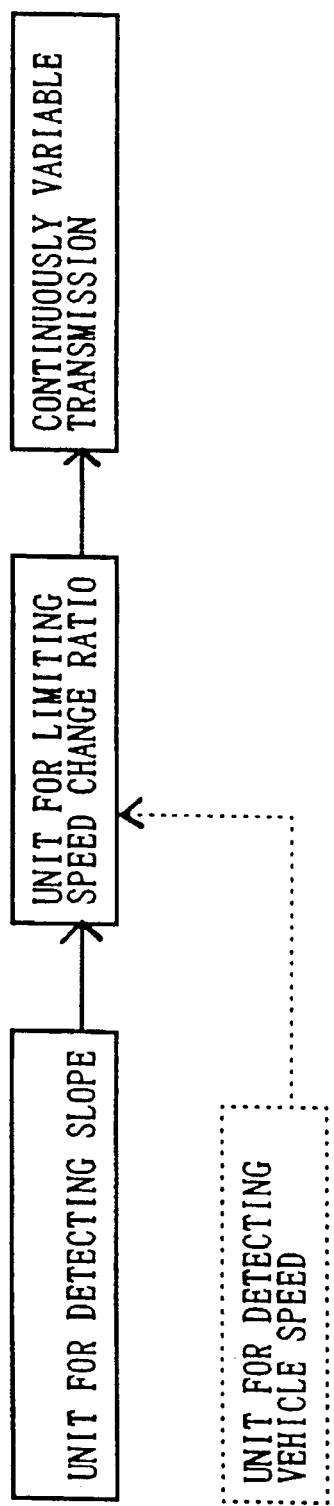
FIGS. 1A and 1B are diagrams showing a basic construction of the present invention.
Figure 1:
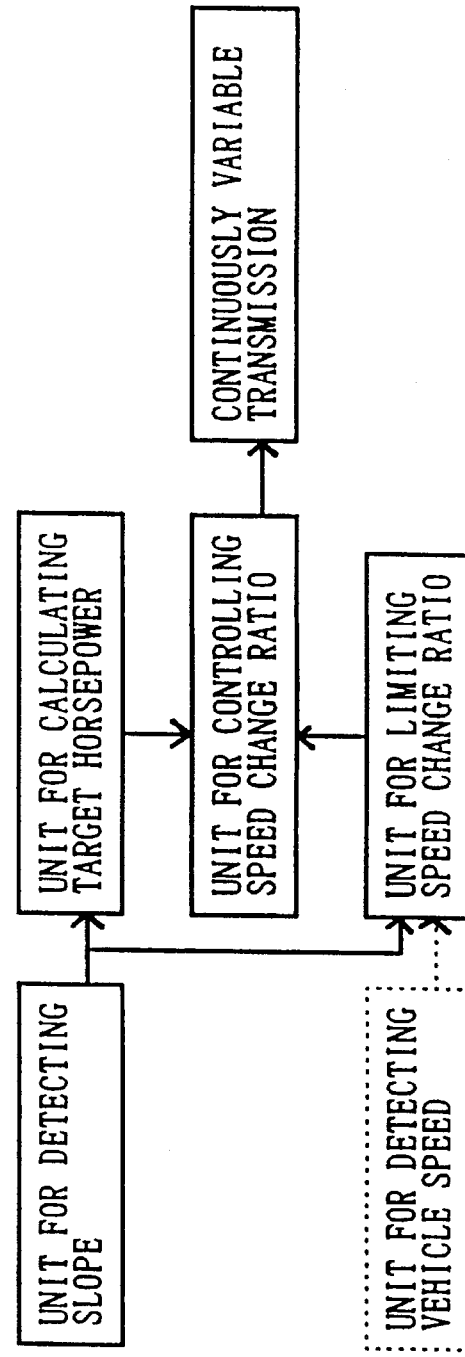

FIGS. 1A and 1B show a basic construction of a control apparatus for a vehicle having a continuously variable transmission according to the present invention. An embodiment of the present invention will be explained with reference to FIGS. 2 to 6.

Figure 2:
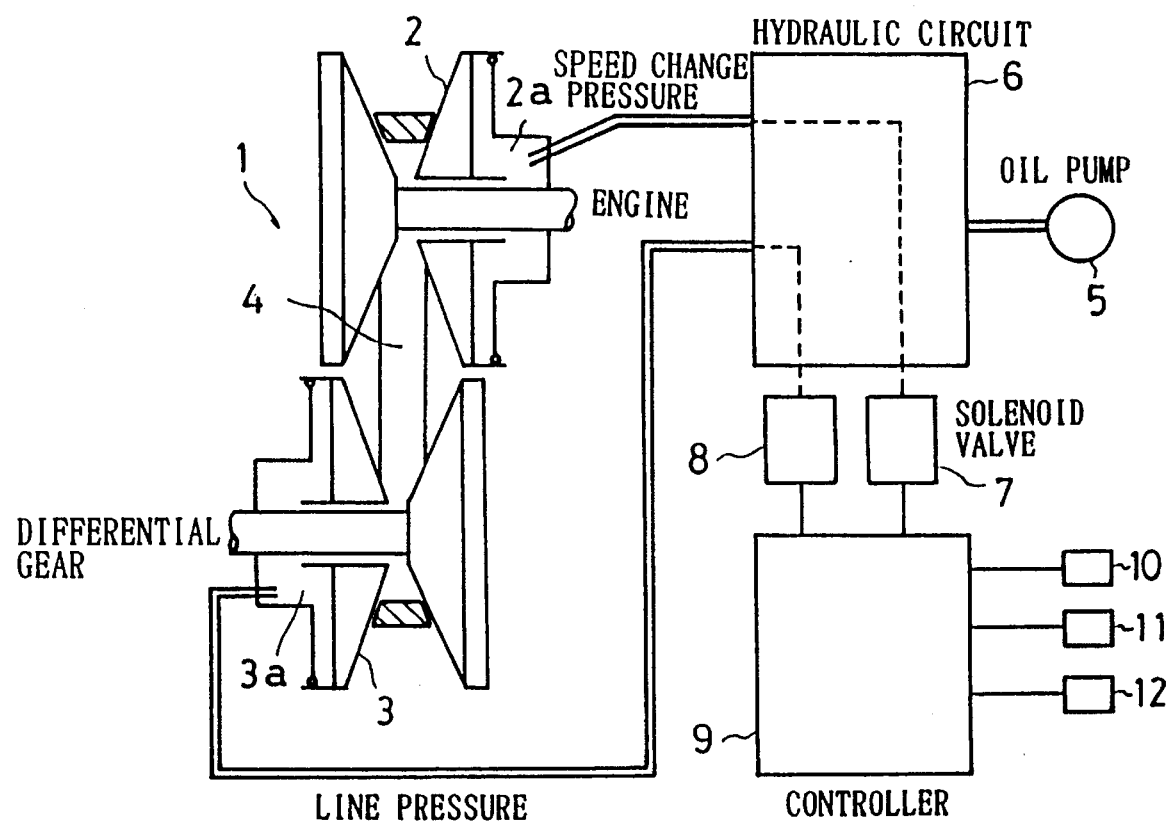
FIG. 2 is a system diagram showing an embodiment of the present invention.

FIG. 2 shows a system according to the embodiment of the present invention.

A continuously variable transmission (CVT) 1 has a primary pulley 2 connected to an engine, a secondary pulley 3 connected to a drive shaft (a differential gear), and a belt 4 extending around the pulleys 2 and 3. A speed change pressure applied to an actuator 2a connected to the primary pulley 2 and a line pressure applied to an actuator 3a connected to the secondary pulley 3 are adjusted to change a pulley ratio, to thereby continuously change a transmission speed change ratio. Any other CVT such as a toroidal CVT is also employable.

The speed change pressure and line pressure are adjusted by controlling the hydraulic pressure of a hydraulic circuit 6 connected to an oil pump 5 with solenoid valves 7 and 8 having a relief function. The solenoid valves 7 and 8 are controlled by a controller 9.

The controller 9 controls the solenoid valves 7 and 8, to control the speed change pressure and line pressure, to thereby control a transmission speed change ratio.

The controller 9 receives detection signals from a speed sensor 10 for detecting a vehicle speed VSP, a throttle sensor 11 for detecting a throttle opening TVO, and an engine rotation sensor 12 for detecting an engine rotational speed Ne. The vehicle speed sensor 10 serves as means for detecting a vehicle speed. The throttle sensor 11 has an idle switch, which is turned ON when a throttle valve is completely closed. A signal from the idle switch is also supplied to the controller 9.

Figure 3:
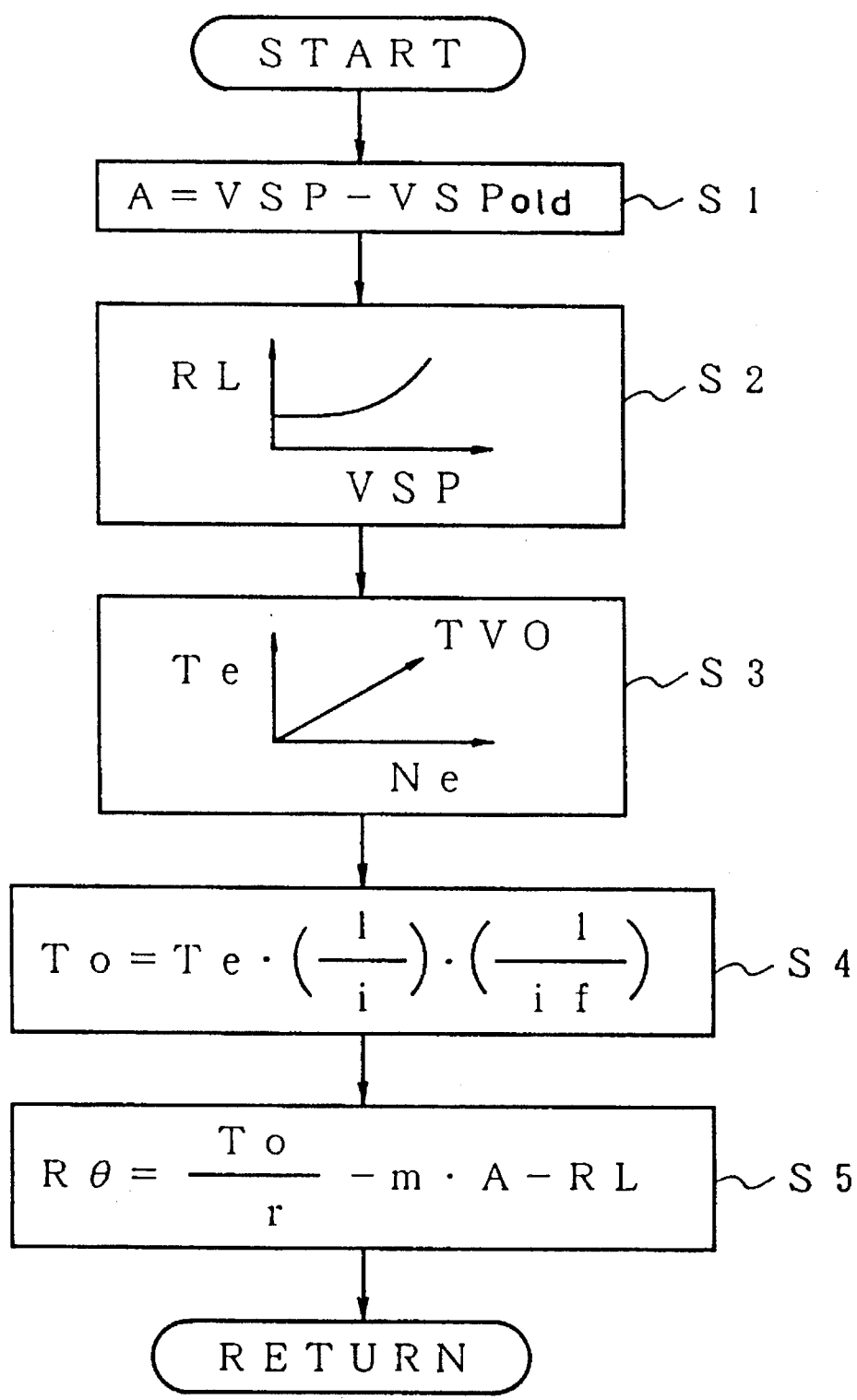
FIG. 3 is a flowchart showing a routine of calculating a hill-climbing resistance.
Figure 4:
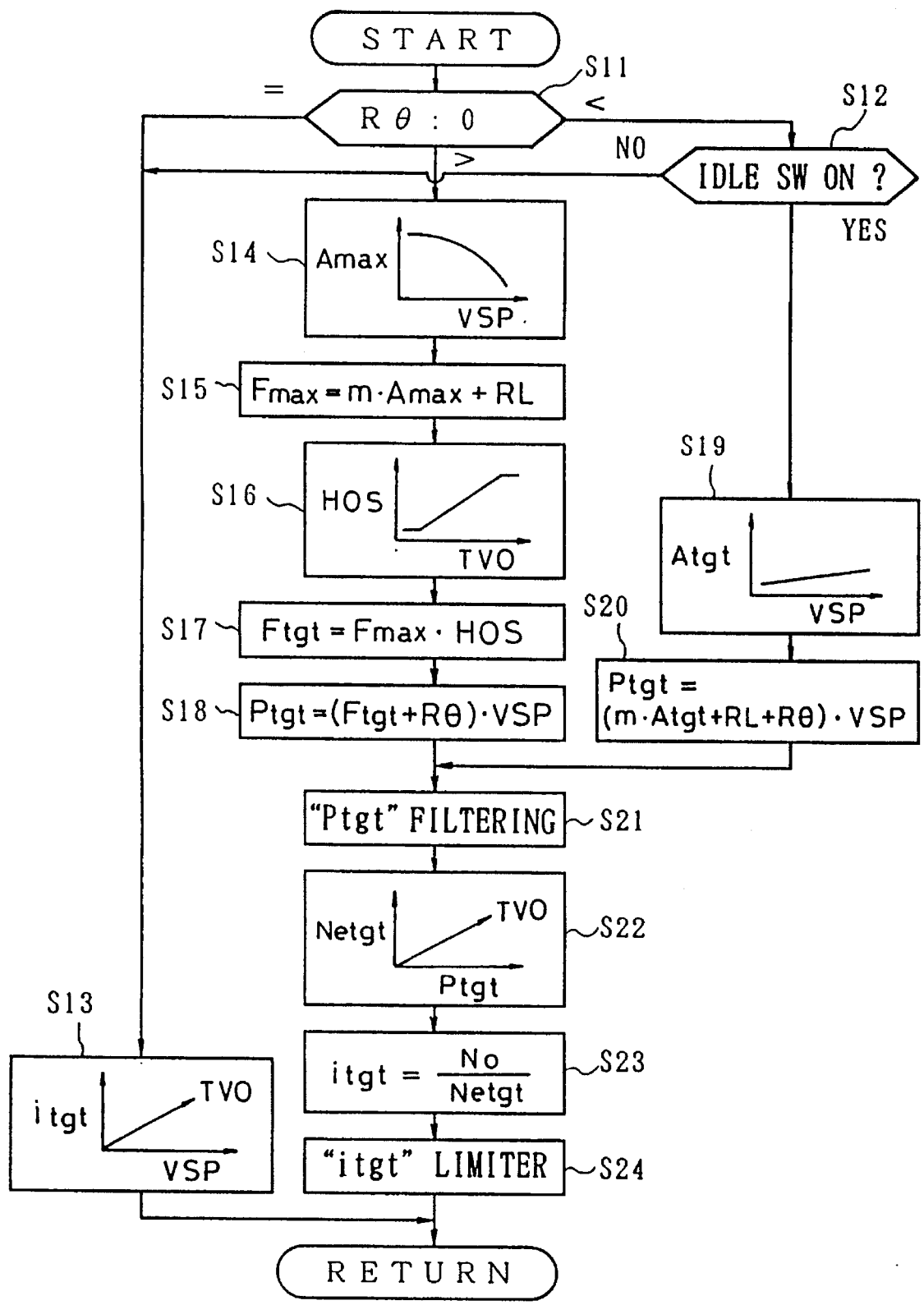
FIG. 4 is a flowchart showing a routine of setting a transmission speed change ratio.

Based on these signals, a microcomputer incorporated in the controller 9 sets a target transmission speed change ratio "itgt" according to the flowcharts of FIGS. 3 and 4 and controls the solenoid valves 7 and 8 to attain the target transmission speed change ratio.

FIG. 3 is a flowchart showing a routine of calculating a hill-climbing resistance. This routine corresponds to means for detecting the slope of a road.

A principle of calculating a hill-climbing resistance will be explained.

The following equation is obtained from the equation of motion of a vehicle:

$$m \cdot A + RL + m \cdot g \cdot \sin\theta = To/r$$

where m is the mass of a vehicle, A is an acceleration, RL is a rolling and air resistance, g is the acceleration of gravity, θ is the slope of a road. To is output torque, and r is the radius of a tire.

The hill-climbing resistance Rθ=m·g·sinθ is calculated as follows:

$$R\theta = To/r - m \cdot A - RL$$

If the radius "r" of a tire and the mass "m" of the vehicle are constants, the hill-climbing resistance Rθ=m·g·sinθ is obtainable according to the acceleration A, rolling and air resistance RL, and output torque To.

This will be explained with reference to the flowchart of FIG. 3.

In step 1 (indicated with a prefix "s" as S1 in the figure), a vehicle speed VSP is read to calculate an acceleration A=VSP−VSPold, where "VSPold" is the preceding vehicle speed.

In step 2, a rolling and air resistance RL is obtained from a map according to the vehicle speed VSP.

In step 3, engine torque Te is obtained from a map according to an engine rotational speed Ne and a throttle opening TVO.

In step 4, output torque To is calculated as follows according to the engine torque Te, a present transmission speed change ratio "i", which is obtained by dividing an output side rotational speed by an input side rotational speed, and the transmission speed change ratio "if" of a differential gear (reciprocal of gear ratio):

$$To = Te \cdot (1/i) \cdot (1/if)$$

In step 5, the hill-climbing resistance Rθ (=m·g·sinθ) is calculated as follows according to the output torque To, acceleration A, and rolling and air resistance RL as follows:

$$R\theta = To/r - m \cdot A - RL$$

where r is the radius of a tire, and m is the mass of the vehicle.

FIG. 4 shows a routine of setting a transmission speed change ratio. This routine corresponds to means for controlling a transmission speed change ratio, including means for calculating a target horsepower.

This routine controls a transmission speed change ratio (a horsepower) so that the vehicle may run on an uphill road at substantially the same throttle opening as on a horizontal road, always achieve proper engine braking on a downhill road of even a large slope, and maintain good drivability both uphill and downhill road. During the control, the routine sets a high-speed-side upper limit on the speed change ratio of the transmission based on the hill-climbing resistance and vehicle speed.

A principle of the controlling of a transmission speed change ratio (a horsepower) on an uphill or downhill road will be explained.

The equation of motion of a vehicle is expressed as follows;

when the vehicle runs on a slope:

$$P=(m \cdot A+RL+m \cdot g \cdot \sin\theta) \cdot VSP$$

when the vehicle runs on a horizontal road ($\theta=0$):

$$P=(m \cdot A+RL) \cdot VSP$$

where P is a horsepower, m is the mass of the vehicle, A is an acceleration, RL is a rolling and air resistance of the vehicle, g is the acceleration of gravity, $\theta$ is the slope of a road, and VSP is a vehicle speed.

To achieve the same acceleration on a slope as on a horizontal road, it is necessary to produce a horsepower of $m \cdot g \cdot \sin\theta \cdot VSP$ in addition to the horsepower that is required to run on a horizontal road.

Accordingly, a required driving force ($F=m \cdot A+RL$) to be produced on a horizontal road is calculated according to the driving conditions of the vehicle, and a target horsepower for the vehicle is calculated according to the required driving force, a hill-climbing resistance $R\theta$ ($=m \cdot g \cdot \sin\theta$), and a vehicle speed VSP. Then, the speed change ratio of the continuously variable transmission is controlled to attain the target horsepower.

If the required driving force to be produced by the vehicle on a horizontal road is Ftgt, the target horsepower Ptgt is calculated as follows:

$$Ptgt=(Ftgt+R\theta) \cdot VSP$$

The speed change ratio of the continuously variable transmission is controlled to attain the target horsepower Ptgt.

To calculate the required driving force Ftgt to be produced by the vehicle on a horizontal road, a maximum acceleration Amax (Amax at throttle full opening) the vehicle can achieve when the hill-climbing resistance $R\theta$ is substantially zero must be calculated at first. The maximum acceleration Amax is calculable according to the vehicle speed VSP. An acceleration resistance (m·Amax) is calculated according to the maximum acceleration Amax and the mass "m" of the vehicle. At the same time, the rolling and air resistance RL of the vehicle is calculated. Thereafter, a maximum driving force Fmax=m·Amax+RL is calculated. A correction coefficient HOS is calculated according to a throttle opening, and the required driving force Ftgt=Fmax·HOS is calculated.

On a downhill road, a required acceleration Atgt is calculated at nearly zero based on a vehicle speed VSP, and a target horsepower Ptgt is calculated as follows:

$$Ptgt=(m \cdot Atgt+RL+R\theta) \cdot VSP$$

Thereafter, the speed change ratio of the continuously variable transmission is controlled to attain the target horsepower Ptgt.

The flowchart of FIG. 4 will be explained.

In step 11, it is determined whether the hill-climbing resistance $R\theta$ is positive, negative or 0. If $R\theta=0$, i.e., the road is horizontal, control proceeds to step 13.

If $R\theta>0$, i.e., the road is uphill, control proceeds to step 14. If $R\theta<0$, i.e., the road is downhill, control proceeds to step 19 through step 12.

[Horizontal road with $R\theta=0$]

In step 13, a map is referred to and sets a target transmission speed change ratio "itgt" is set according to the vehicle speed VSP and throttle opening TVO, to control the transmission to attain the target transmission speed change ratio.

[Uphill road with $R\theta>0$]

In step 14, a map is referred to and, according to the vehicle speed VSP, a maximum acceleration Amax to be achieved under a full throttle opening is obtained.

In step 15, a maximum driving force Fmax is calculated as follows based on the maximum acceleration Amax and the rolling and air resistance RL:

$$Fmax=m \cdot Amax+RL$$

Here, the acceleration resistance m·Amax is calculated based on the maximum acceleration Amax and the mass "m" of the vehicle, and the maximum driving force Fmax is calculated by adding the rolling and air resistance RL to the acceleration resistance m·Amax.

In step 16, a correction coefficient HOS is obtained from a map according to the throttle opening TVO. The correction coefficient HOS is used to calculate a required driving force Ftgt for the present throttle opening according to the maximum driving force Fmax for a full throttle opening. The correction coefficient HOS is 1 when the throttle valve is fully opened and approaches 0 as the throttle valve is closed.

In step 17, the maximum driving force Fmax for a full throttle opening is multiplied by the correction coefficient HOS corresponding to the present throttle opening, to provide the required driving force Ftgt as follows:

$$Ftgt=Fmax \cdot HOS$$

After the calculation of the required driving force Ftgt, control proceeds to step 18.

In step 18, a target horsepower Ptgt is calculated as follows according to the required driving force Ftgt, hill-climbing resistance $R\theta$, and vehicle speed VSP:

$$Ptgt=(Ftgt+R\theta) \cdot VSP$$

After the calculation of the target horsepower Ptgt, control proceeds to step 21.

In step 21, the target horsepower Ptgt is filtered according to the following equations (1) and (2). Ptgt' indicates a filtered target horsepower.

$$X_0 = A \cdot X_{-1} + B \cdot Ptgt \quad (1)$$

$$Ptgt' = C \cdot X_0 + D \cdot Ptgt \quad (2)$$

$$X = \begin{pmatrix} X_0 \\ X_1 \end{pmatrix} \quad A = \begin{pmatrix} a_0 \ a_1 \\ a_2 \ a_3 \end{pmatrix} \quad B = \begin{pmatrix} b_0 \\ b_1 \end{pmatrix}$$

$$C = (c_0 \ c_1) \quad D = (d)$$

The CVT continuously changes the speed change ratio thereof. Namely, the speed change ratio is changed in response to even a small slope or a short change in slope. Accordingly, it is necessary to control the response of the CVT with respect to a slope or a target horsepower, so that it may not always change the speed change ratio. For this purpose, the embodiment employs a low-pass filter to filter the target horsepower Ptgt.

Alternatively, a moving average Ptgt' of the target horsepower may be calculated as follows:

$$Ptgt'=[(x-1)/x] \cdot Ptgt'+(1/x) \cdot Ptgt$$

where x is a weight constant.

In step 22, a map is referred to obtain a target engine rotational speed Netgt according to the filtered target horsepower Ptgt' and throttle opening TVO.

In step 23, a target transmission speed change ratio "itgt" is calculated according to the target engine rotational speed Netgt and output rotational speed No (the vehicle speed VSP), as follows:

$$itgt=No/Netgt$$

In step 24, a limiter process on the target transmission speed change ratio "itgt", is carried out to limit a high-speed-side (SD-side) upper limit on the speed change ratio of the transmission. This corresponds to means for limiting the speed change ratio of a transmission.

Figure 5:
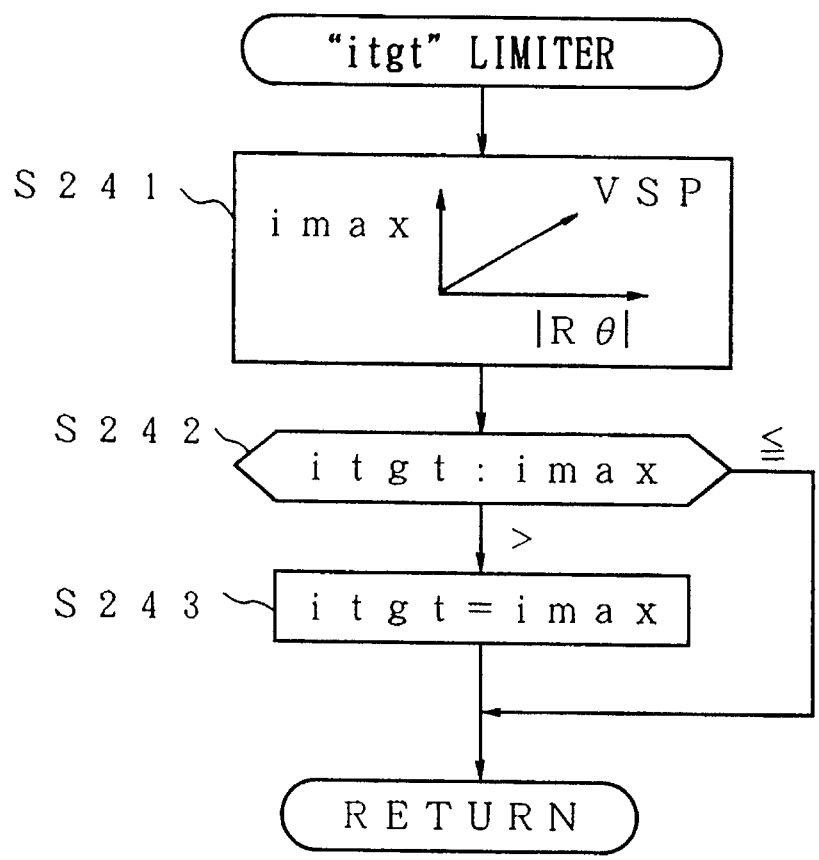
FIG. 5 is a flowchart diagram showing a subroutine of a limiter process.
Figure 6:
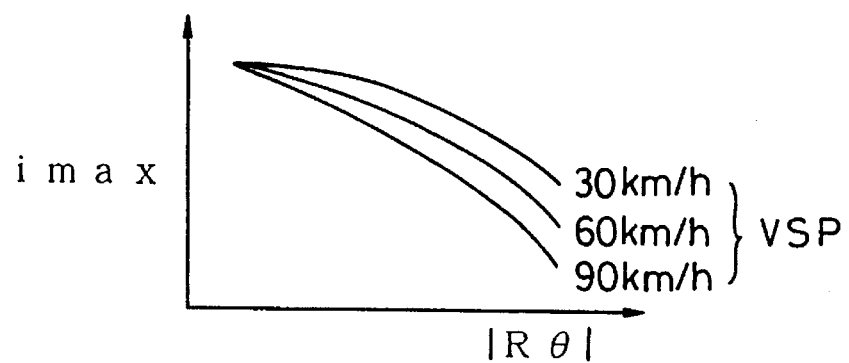
FIG. 6 is a map for setting an upper limit on the speed change ratio of a transmission.

FIG. 5 shows a subroutine for the limiter process. In step 241, a map shown in FIG. 6 is referred to and a high-speed side upper limit "imax" on the speed change ratio of the transmission is set by retrieval according to the absolute value |Rθ| of the hill-climbing resistance and the vehicle speed VSP. In step 242, the target transmission speed change ratio "itgt" is compared with the upper limit "imax". If the target transmission speed change ratio "itgt" exceeds the upper limit "imax" (itgt>imax), control proceeds to step 243 wherein the target transmission speed change ratio "itgt" is limited as itgt=imax.

As shown in FIG. 6, the upper limit "imax" is determined according to a decreasing function (a monotone non-increasing function) with respect to the absolute value |Rθ| of the hill-climbing resistance. As the slope of a road becomes larger, the upper limit "imax" becomes smaller, to prevent the transmission from shifting up and drive the vehicle on a low-speed gear.

The upper limit "imax" is also determined according to a decreasing function (a monotone non-increasing function) with respect to the vehicle speed VSP, so that the upper limit becomes smaller as the vehicle speed increases. This prevents the transmission from shifting up and drives the vehicle on a low-speed gear.

[Downhill road with Rθ<0]

In step 12, it is determined whether or not the idle switch is ON, i.e., whether or not the throttle valve is completely closed. If the idle switch is OFF, it is determined that there is an intention to accelerate even on a downhill road. Accordingly, control proceeds to step 13 wherein the speed change ratio is controlled similar to the horizontal case.

If the idle switch is ON, control proceeds to step 19 wherein a map is referred to and a required acceleration Atgt is set according to the vehicle speed VSP. This required acceleration Atgt is close to zero.

In step 20, a target horsepower Ptgt is calculated as follows according to the required acceleration Atgt:

$$Ptgt=(m \cdot Atgt+RL+R\theta) \cdot VSP$$

Thereafter, the steps 21 to 24 are executed similar to the uphill case.

The steps 14 to 18, 19, and 20 of FIG. 4 correspond to means for calculating a target horsepower, the steps 22 and 23 correspond to means for controlling a transmission speed change ratio, and the step 24 (the steps 241 to 243 of FIG. 5) corresponds to means for limiting a transmission speed change ratio.

With these steps, it is possible for the vehicle to run on an uphill road at substantially the same throttle opening as on a horizontal road, always achieve proper engine braking on a downhill road of even a large slope, and maintain good driveability both on uphill and downhill roads.

By limiting an upper limit on the speed change ratio of a transmission, the transmission from shifting up when an accelerator is released on a curved uphill road can be prevented, to thereby prevent transmission-gear-ratio hunting.

Although the embodiment employs a hill-climbing resistance Rθ=m·g·sinθ as a value related to the slope of a road, the slope-related value may be a slope of sinθ (usually sinθ×100%).

As explained above, with the present invention, a value related to the slope of a road and a value related to the speed of a vehicle are detected. Based on these values, a high-speed-side upper limit on the speed change ratio of a continuously variable transmission is limited, to prevent the transmission from shifting up when an accelerator is released on a curved uphill road and avoid transmission-speed change ratio hunting on the curved uphill road. Accordingly, the present invention has great industrial applicability.

A high-speed-side upper limit on the speed change ratio of a transmission of a vehicle is set and limited according to a decreasing function with respect to the absolute value of a value related to the slope of a road, to thereby prevent the transmission from shifting up as the slope increases and drive the vehicle on a low-speed gear.

Moreover, a high-speed-side upper limit on the speed change ratio of a transmission of a vehicle is set and limited according to a decreasing function with respect to the a value related to the speed of a vehicle, to thereby drive the vehicle on a low-speed gear because the rolling and air resistance of the vehicle increases as the vehicle speed increases.

I claim:

1. A control apparatus for a vehicle having a continuously variable transmission between an engine and a drive shaft, comprising:

slope detecting means for detecting a value related to the slope of a road;

vehicle speed detecting means for detecting a value related to a vehicle speed; and speed change ratio limiting means for limiting high-speed-side upper limit on the speed change ratio of the continuously variable transmission according to the slope-related value and vehicle-speed-related value.

2. The control apparatus according to claim 1, wherein said speed change ratio limiting means sets the high-speed-side upper limit on the speed change ratio of the transmission according to a decreasing function with respect to the absolute value of the slope-related value.

3. The control apparatus according to claim 1, wherein said speed change ratio limiting means sets the high-speed-side upper limit on the speed change ratio of the transmission according to a decreasing function with respect to the vehicle-speed-related value.

4. The control apparatus for a vehicle having a continuously variable transmission between an engine and a drive shaft, comprising:

slope detecting means for detecting a value related to the slope of a road:

target horsepower calculating means for calculating a target horsepower to be produced by the vehicle according to at least the slope-related value;

speed change ratio control means for controlling the speed change ratio of the continuously variable transmission, to attain the target horsepower;

vehicle speed detecting means for detecting a value related to a vehicle speed; and speed change ratio limiting means for limiting a high-speed-side upper limit on the speed change ratio of the continuously variable transmission according to the slope-related value and vehicle-speed-related value.

5. The control apparatus according to claim 4, wherein said speed change ratio limiting means sets the high-speed-side upper limit on the speed change ratio of the transmission according to a decreasing function with respect to the vehicle-speed-related value.

6. The control apparatus according to claim 4, wherein said speed change ratio limiting means sets the high-speed-side upper limit on the speed change ratio of the transmission according to a decreasing function with respect to the absolute value of the slope-related value.

* * * * *